(12) United States Patent
Brandes et al.

(10) Patent No.: US 8,108,232 B1
(45) Date of Patent: Jan. 31, 2012

(54) SYSTEM AND METHOD FOR PROJECT CONTRACT MANAGEMENT

(75) Inventors: Tracy T. Brandes, Parker, TX (US); Pramod B. Fernandez, Overland Park, KS (US); Philip Issa, Irving, TX (US); Valerie Y. Lee, Lewisville, TX (US); Lih-Jong Ma, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1309 days.

(21) Appl. No.: 11/138,132

(22) Filed: May 26, 2005

(51) Int. Cl.
 *G06Q 10/00* (2006.01)
(52) U.S. Cl. .................................................. 705/7.11
(58) Field of Classification Search ............. 705/9, 7.11
 See application file for complete search history.

(56) References Cited

U.S. PATENT DOCUMENTS

| | | | | |
|---|---|---|---|---|
| 5,191,613 A * | 3/1993 | Graziano et al. | | 713/176 |
| 5,208,765 A | 5/1993 | Turnbull | | |
| 5,548,506 A | 8/1996 | Srinivasan | | |
| 5,692,206 A * | 11/1997 | Shirley et al. | | 715/256 |
| 5,765,140 A | 6/1998 | Knudson et al. | | |
| 5,864,480 A | 1/1999 | Ladd | | |
| 5,893,074 A | 4/1999 | Hughes et al. | | |
| 6,236,984 B1 * | 5/2001 | Owens et al. | | 707/1 |
| 6,324,647 B1 | 11/2001 | Bowman-Amuah | | |
| 6,405,364 B1 | 6/2002 | Bowman-Amuah | | |
| 6,601,234 B1 | 7/2003 | Bowman-Amuah | | |
| 6,671,818 B1 | 12/2003 | Mikurak | | |
| 6,684,191 B1 | 1/2004 | Barnard et al. | | |
| 6,694,329 B2 | 2/2004 | Murray | | |
| 6,785,658 B1 * | 8/2004 | Merker et al. | | 705/1 |
| 6,865,565 B2 | 3/2005 | Rainsberger et al. | | |
| 6,904,593 B1 | 6/2005 | Fong et al. | | |
| 6,934,715 B2 * | 8/2005 | Kalmes et al. | | 707/102 |
| 6,961,687 B1 | 11/2005 | Myers, Jr. et al. | | |
| 6,964,044 B1 | 11/2005 | Hudson et al. | | |
| 7,007,227 B1 * | 2/2006 | Constantino et al. | | 715/256 |
| 7,051,036 B2 | 5/2006 | Rosnow et al. | | |
| 7,065,496 B2 * | 6/2006 | Subbloie et al. | | 705/11 |
| 7,089,203 B1 * | 8/2006 | Crookshanks | | 705/37 |
| 7,139,999 B2 | 11/2006 | Bowman-Amuah | | |
| 7,171,379 B2 * | 1/2007 | Menninger et al. | | 705/28 |
| 7,212,987 B2 | 5/2007 | Swanke et al. | | |
| 7,222,109 B1 * | 5/2007 | Flanagan et al. | | 705/80 |
| 7,231,362 B2 * | 6/2007 | Wilce et al. | | 705/35 |
| 7,305,392 B1 * | 12/2007 | Abrams et al. | | 707/9 |

(Continued)

OTHER PUBLICATIONS

Harris, Audley; Giunipero, Larry C.; Hult, G. Tomas M. "Impact of Organizational and Contract Flexibility on Outsourcing Contracts". 1998. Industrial Marketing Management. vol. 27. pp. 373-384.*

(Continued)

*Primary Examiner* — Peter Choi

(57) ABSTRACT

A computer-implemented system for managing contracts for projects is provided. The system consists of a data store and an analysis component. The data store can maintain information related to a project including an original contract defining at least some aspects of the project. The data store can also maintain information for a plurality of interim contracts that include a change to the original contract. The information for the plurality of interim contracts can include resource information, date information, financial information, and variance information. The variance information is related to the change between one of the interim contracts and the original contract. The analysis component identifies the variance between the original contract and one or more of the interim contracts.

14 Claims, 3 Drawing Sheets

| | Contract | Financial | Resource | Delivery Date | Variance |
|---|---|---|---|---|---|
| 110 | 1 (baseline) | $1000 | 10 | 1/1 | - |
| 120 | 2 | $1200 | 10 | 1/1 | +20% (financial) |
| 130 | 3 | $1200 | 11 | 1/1 | +10% (resource) |
| 140 | 4 | $1200 | 11 | 2/1 | +31 days (delivery date) |
| 150 | 5 | $1500 | 11 | 2/1 | +50% (financial) |
| 160 | 6 | $1200 | 11 | 2/1 | -20% (financial) |
| 170 | 7 (exit) | $1600 | 12 | 2/1 | +60% (financial) +20% (resource) +31 days (delivery date) |

(columns labeled 10, 20, 30, 40, 50)

5

U.S. PATENT DOCUMENTS

| | | | |
|---|---|---|---|
| 7,308,410 B2* | 12/2007 | Bowe et al. | 705/1 |
| 7,333,996 B2* | 2/2008 | Berry et al. | 707/101 |
| 2002/0042731 A1 | 4/2002 | King, Jr. et al. | |
| 2002/0059512 A1 | 5/2002 | Desjardins et al. | |
| 2002/0099598 A1* | 7/2002 | Eicher et al. | 705/11 |
| 2002/0107914 A1* | 8/2002 | Charisius et al. | 709/203 |
| 2003/0018952 A1 | 1/2003 | Roetzheim | |
| 2003/0033191 A1 | 2/2003 | Davies et al. | |
| 2003/0050804 A1* | 3/2003 | Hendershot | 705/4 |
| 2003/0083897 A1* | 5/2003 | Baldwin et al. | 705/1 |
| 2004/0010463 A1* | 1/2004 | Hahn-Carlson et al. | 705/39 |
| 2004/0085355 A1* | 5/2004 | Harmes et al. | 345/751 |
| 2004/0143811 A1 | 7/2004 | Kaelicke et al. | |
| 2005/0114829 A1 | 5/2005 | Robin et al. | |

OTHER PUBLICATIONS

Loosemore, M.; Hughes, K. "Emergency Systems in Construction Contracts". 1998. Engineering, Construction and Architectural Management. vol. 5, Issue 2. pp. 189-198.*

Schanze, Erich; "Failure of Long-Term Contracts and the Duty to Renegotiate". 1997. pp. 155-165.*

Salacuse, Jeswald W. "Renegotiating International Project Agreements". 2001. Fordham International Law Journal. vol. 24. pp. 1319-1370.*

Berger, Klaus Peter. "Renegotiation and Adaptation of International Investment Contracts: The Role of Contract Drafters and Arbitrators". Oct. 2003. Vanderbilt Journal of Transnational Law.vol. 36. pp. 1347-1380.*

Joskow, Paul L. "Price Adjustment in Long-Term Contracts: The Case of Coal". 1998. Journal of Law and Economics. vol. 31.pp. 47-83.*

Tirole, Jean. "Procurement and Renegotiation". Apr. 1986. The Journal of Political Economy. vol. 94, Issue 2. pp. 235-259.*

Scott, Robert E. "Conflict and Cooperation in Long-Term Contracts". Dec. 1987. California Law Review. vol. 75, Issue 6. pp. 2005-2054.*

Floyd, Lori A.; Caddell, Christopher P.; Wisniewski II, David E.; "Application of Appropriate Project Control Tools". 2003. AACE International Transactions. pp. CSC.04.1-CSC.04.11.*

Salacuse, Jeswald W. "Renegotiating Existing Agreements: How to Deal with "Life Struggling Against Form" ". Oct. 2001. Negotiation Journal. vol. 17, Issue 4. pp. 311-331.*

Hemmat, Merzad, "Defining and Sizing Feasible Approaches to Business Needs Within an Integrated Development Process," Filing Date—May 5, 2003, U.S. Appl. No. 10/429,615, Specification (33 pgs.) and Drawings (3 sheets).

Hemmat, Merzad, "Method for Discovering Functional and System Requirements in an Integrated Development Process," Filing Date—Aug. 18, 2003, U.S. Appl. No. 10/643,334, Specification (29 pgs.) and Drawings (4 sheets).

Issa, Philip, "EDP Portal Cross-Process Integrated View," Filing Date—Aug. 19, 2003, Specification (43 pgs.) and Drawings (6 sheets).

* cited by examiner

| Contract | Financial | Resource | Delivery Date | Variance |
|---|---|---|---|---|
| 1 (baseline) | $1000 | 10 | 1/1 | - |
| 2 | $1200 | 10 | 1/1 | + 20% (financial) |
| 3 | $1200 | 11 | 1/1 | + 10% (resource) |
| 4 | $1200 | 11 | 2/1 | + 31 days (delivery date) |
| 5 | $1500 | 11 | 2/1 | + 50% (financial) |
| 6 | $1200 | 11 | 2/1 | - 20% (financial) |
| 7 (exit) | $1600 | 12 | 2/1 | + 60% (financial)<br>+ 20% (resource)<br>+ 31 days (delivery date) |

SYSTEM AND METHOD FOR PROJECT CONTRACT MANAGEMENT

CROSS-REFERENCE TO RELATED APPLICATIONS

This application contains subject matter related to U.S. patent application Ser. No. 10/429,615, filed May 5, 2003 and entitled "Defining and Sizing Feasible Approaches to Business Needs Within an Integrated Development Process", to U.S. patent application Ser. No. 10/643,334, filed Aug. 18, 2003 and entitled "Method For Discovering Functional and System Requirements In An Integrated Development Process", and to U.S. patent application Ser. No. 10/643,417, filed Aug. 19, 2003 and entitled "EDP Portal Cross-Process Integrated View", all of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of projects. More particularly, embodiments of the present invention provide a system and method for managing multiple contracts related to development projects.

BACKGROUND OF THE INVENTION

An enterprise might initiate multiple projects to achieve its goals. The projects typically have budgets or other targets that should be met in order to complete the projects in a cost-effective manner. It is typically desirable to keep track of how the projects are progressing in relation to the targets.

SUMMARY OF THE INVENTION

An embodiment of the invention is a computer-implemented system for managing contracts for projects. The system consists of a data store and an analysis component. The data store can maintain information related to a project including an original contract defining at least some aspects of the project. The data store can also maintain information for a plurality of interim contracts that include a change to the original contract. The information for the plurality of interim contracts can include resource information, date information, financial information, and variance information. The variance information is related to the change between one of the interim contracts and the original contract. The analysis component is operable to identify the variance between the original contract and one or more of the interim contracts.

A method for managing contracts for projects is also provided. The method includes maintaining information related to an original contract describing a project. The method also includes maintaining information related to a first interim contract and a second interim contract. The first interim contract includes information related to a change in the project from the original contract. The second interim contract includes information related to another change in the project from the first interim contract. At least one of the original contract and first and second interim contracts include a resource information, a date information, a financial information, and a variance information. The variance information is related to the change to the project. The method also includes using the variance information to analyze the changes in the project between the one or more of the original contracts and the first and second interim contracts.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In an embodiment, the consumers and the suppliers of services or products might enter into a contract to spell out the work to be done on a project. The parameters of a project would typically be specified in a series of contracts, each of which specifies one or more changes to one or more parameters. The contracts might establish various targets that the project should meet, including financial budgets, resource projections (for human resources or computer hardware, for example), forecasted completion dates, and other targets. The contracts might include a baseline contract, one or more interim contracts, and an exit contract.

The baseline contract might establish the initial targets for a project. The baseline contract is typically not editable once it has been agreed on. When a project progresses through a series of steps or phases, an exit contract might need to be approved to allow the project to move from one step or phase to the next. Between the baseline and exit contracts, multiple interim contracts might be created when changes to project parameters occur. Reasons for the creation of an interim contract might include changes in the scope, schedule, or financial status of a project, or an issue with a vendor.

In an embodiment, a computer-implemented system for managing the contracts provides the ability to view all the target information about all active projects within an enterprise. Comparisons can be made between any contract and any previous contract. For example, the current contract could be compared to the immediately preceding contract, or the current contract could be compared to the baseline contract. A variance can automatically be calculated between any two contracts, where the variance might be a difference between values in two contracts, a percentage change between values in two contracts, or some other measurement of change.

Projects can be grouped by organizational division, by project phase, or other categories. Different versions of contracts for a single project and contracts for multiple projects are automatically stored and can be viewed in a single location. A search can be done for one project and all related contracts can appear. Views can be provided of any items that changed and how, when, and why they changed.

Figure 1:
FIG. 1 is a diagram of a contract management interface according to an embodiment of the present disclosure.

FIG. 1 illustrates an embodiment of an interface 5 that depicts various contracts and the parameters that they specify. Column 10 lists a series of contracts for a project. Column 20 lists the financial budget specified in each contract. Column 30 lists the resources projected by each contract to be needed for the project. In this case, the resources are human resources, but in other embodiments other types of resources or additional types of resources could be listed. Column 40 lists the dates by which a project is expected to be completed. Column 50 lists the variances between the parameters specified in various contracts.

While only one column for variance is shown, in other embodiments a column for variance might be present for each type of target. Also, while the interface 5 shown in FIG. 1 lists only the financial, resource, and delivery date targets, in other embodiments other targets or parameters and/or additional targets or parameters could be listed and all relevant information for project development and project management may be maintained.

For example, other parameters might include the phase a project is in, the justification for a project, the total amount of money spent to date on a project, the amount of money and/or resources expected to be used up to the next contract, a ranking of the relative importance or priority of the projects, the strategic category to which a project belongs, the supplier and sponsor of a project, and other information. In cases where this additional information is quantifiable, a variance might also be listed. Thus, while the financial column 20 illustrates a total dollar value, other views may provide costs broken down into various categories or other depictions of financial information. The resources column 30 may identify or link to individuals, roles, responsibilities, or other resource information. The delivery date column 40 may show start and/or finish dates at various states or milestones. Examples of such information are found in U.S. patent application Ser. No. 10/429,615, filed May 5, 2003 and entitled "Defining and Sizing Feasible Approaches to Business Needs Within an Integrated Development Process", and in U.S. patent application Ser. No. 10/643,334, filed Aug. 18, 2003 and entitled "Method For Discovering Functional and System Requirements In An Integrated Development Process", both of which are incorporated herein by reference.

Various values are entered into the fields of the interface 5 for illustration purposes. The system is operable to maintain comprehensive data for management of project development; however, the illustrated information is provided for simplicity and brevity. Row 110 depicts a baseline contract with a financial budget of $1000, a human resource projection of 10 people, and an expected completion date of January 1. No variance is listed since this is an original contract that has no previous contract with which it can be compared.

A first interim contract, contract number 2, is shown on row 120. In this case, the financial budget has been increased to $1200 while the projected resources and the expected completion date remain the same. The variance column 50 shows that the budget increased 20% from the baseline contract to the first interim contract. Alternatively, the variance column 50 could show an increase of $200 from the baseline contract to the first interim contract or some other measurement of the variance.

Row 130 shows a second interim contract, contract number 3. In this case, the projected resources have been increased to 11 while the financial budget and the expected completion date remain the same. The variance column 50 shows that the projected resources increased 10% from the baseline contract to the second interim contract. Alternatively, the variance column 50 could show an increase of 1 from the baseline contract to the second interim contract or some other measurement of the variance. Also, a first variance column could show the variance as a difference and a second variance column could show the variance as a percentage, or some other depictions or combination of depictions of variance could be given.

In row 140, a third interim contract, contract number 4, is shown. The expected completion date has changed from January 1 to February 1 while the financial budget and the projected resources remain the same. The variance column 50 shows that the expected time for completion increased by 31 days from the baseline contract to the third interim contract. Alternatively, the variance column 50 could show a percentage increase or some other measurement of the variance between the expected completion time in the baseline contract and the expected completion time in the third interim contract.

A fourth interim contract, contract number 5, is shown on row 150. The financial budget has again been increased, in this case to $1500. The projected resources and the expected completion date remain the same. The variance column 50 for this contract shows that the budget increased 50% from the baseline contract to the first interim contract. Alternatively, the variance column 50 could show an increase of 25% from the third interim contract to the fourth interim contract. Again, a dollar amount or some other measurement could also be used to show the variance or multiple variance fields could be provided.

Row 160 shows a fifth interim contract, contract number 6. In this case, the financial budget has been decreased to $1200 while the projected resources and the expected completion date remain the same. The variance column 50 shows that the budget decreased 20% from the fourth interim contract to the fifth interim contract. Alternatively, the variance column 50 could show an increase of 20% from the baseline contract to the fifth interim contract.

Row 170 shows the parameters of an exit contract, a final contract that will be the basis for moving from one step or phase of a project to the next. In this case, two parameters have changed. The financial budget has been increased to $1600 and the projected resources have been increased to 12. The variance column 50 shows the total variance from the baseline contract to the final contract for the three targets: financial budget, projected resources, and completion date. Alternatively, a separate variance column could be present for each of the target parameters.

Projects can be categorized by the reasons for their variance from a previous contract. Reasons for variance might include a schedule change, a scope change, a financial change, a split project change (the splitting of a single project into one or more projects), a deploy-launch change (an issue with deploying a project into a production environment), and other issues. In an embodiment, each standard cause for variance is given a code. The coding of the causes for variance allows searches to easily be performed to determine if common variance reasons exist across multiple projects. The coding also allows easier determination of the frequency of the various reasons for variance.

In an embodiment, an updated contract is created whenever a major change occurs in the parameters of a project. A variance can then be calculated between the new contract and a previous contract. In an alternative embodiment, a variance might first be calculated and, if the variance exceeds a pre-established threshold, a new contract might be created. Alternatively, a committee might review the variance and decide whether an updated contract is necessary.

A project contract management system as described above might be used in conjunction with an enterprise's established development procedures. For example, in large-scale software development projects, an enterprise might follow a consistent set of steps known as the Enterprise Development Process (EDP). The EDP can be employed to facilitate the integration of enterprise architecture and provide rigor to the process of enterprise-wide software development. Consistent checkpoints throughout the process allow significant events to occur in a predictable, scheduled manner. Examples of EDP are given in the above patent applications previously incorporated by reference.

In an embodiment, the actions performed in the EDP are carried out by means of an enterprise project development system that can be referred to as the EDP Portal. The EDP Portal is a web-based software application that supports a process-based, activity-based management model of software development by providing an organization-wide, standardized means of collecting, managing, and reporting on work flowing through the software development process. The EDP Portal can provide a real-time, synergistic combination of a collaboration tool, a reporting interface, and a planning/execution environment.

The EDP Portal can be considered a series of web-based graphical user interfaces, or screens, in which project-related data can be viewed or edited. A set of screens can show the process flows for various phases of a concept or project. The EDP Portal can also include a database or a similar data store for retaining EDP-related data. A detailed description of the EDP Portal is given in U.S. patent application Ser. No. 10/643,417, filed Aug. 19, 2003 and entitled "EDP Portal Cross-Process Integrated View" which is incorporated herein by reference.

Figure 2:
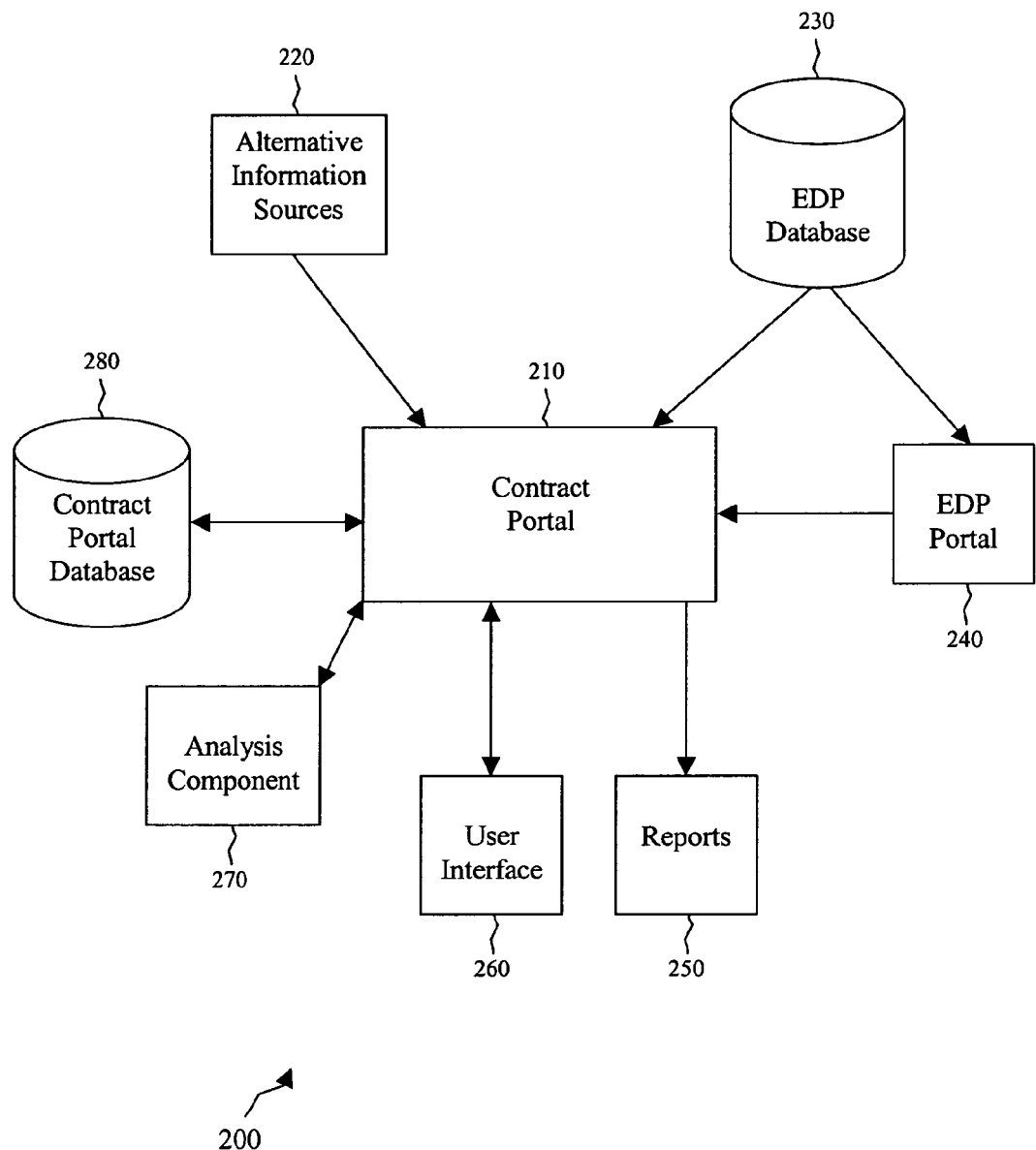
FIG. 2 is a block diagram of a contract management system according to an embodiment of the present disclosure.

FIG. 2 illustrates a system 200 that might be used to implement a project contract management system. The system 200 might be used in conjunction with the EDP Portal 240, as shown, or might be a stand-alone system. In the embodiment of FIG. 2, a component referred to as a contract portal 210 acts as a central hub for the management of project contracts. In order to display an interface such as that shown in FIG. 1, the contract portal 210 can receive data from multiple sources and manipulate the data as needed.

One data source might be the EDP Portal 240 and/or an EDP database 230 used by the EDP Portal 240. Information about projected human resources to be used on a project, target completion dates for a project, the phase a project is in, the priority of a project, and other information would typically be stored in the EDP database 230. In one embodiment, this information might be pulled directly from the EDP database 230 into the contract portal 210. In another embodiment, the contract portal 210 might not have direct access to the EDP database 230 and the information might move from the EDP database 230 to the EDP Portal 240 and then from the EDP Portal 240 to the contract portal 210.

Information about the resources used or projected to be used on a project would typically be stored in the EDP database 230 in the form of hours rather than dollars. If a view of the resources in terms of dollars is desired, that information might be pulled from an alternative information source 220, such as a human resources database. Alternatively, hours might be pulled from the EDP Portal 240 and then converted to dollars. The conversion might be made based on an average billing rate for the personnel involved in a project or on some other appropriate method. Another alternative information source 220 might be the manual entry of contract-related data that cannot be automatically pulled from a database.

Information pulled from the EDP Portal 240, the EDP database 230, and/or alternative information sources 220 can be maintained in a contract portal database 280. This information might then be displayed in a user interface 260 and/or displayed or printed in one or more reports 250. That is, the user interface 260 and/or the reports 250 might show the contract-related information stored in the contract portal database 280 such as the human resource associated with a project, a forecasted completion date for a project, a cost for a project, a variance between two project contracts, and/or a variance code for a variance. The variance between two project contracts can be calculated by an analysis component 270.

While the contract portal 210, the reports 250, the user interface 260, the analysis component 270, and the contract portal database 280 are shown in FIG. 2 as separate components, other arrangements are possible. For example, rather than the contract portal 210 being a separate component with which the analysis component 270 and the contract portal database 280 communicate, the contract portal 210 might be comprised of the analysis component 270 and the contract portal database 280. Also, the reports 250 and the user interface 260 might be a single component. Similarly, the reports 250, the user interface 260, the analysis component 270, and the contract portal database 280 might collectively be considered a single component that comprises the contract portal 210. The analysis component 270 is operable to identify the variances between the original contract and one or more of the interim contracts, or between interim contracts. The identified variances may be analyzed manually, or in some embodiments, automatically by the analysis component 270. Other arrangements of these components will present themselves to one of skill in the art and are to be considered within the scope of this disclosure.

The contract portal 210 provides a central repository for multiple diverse pieces of contract-related information that might otherwise have to be sought in multiple locations. An up-to-date record is maintained of any variances that have occurred, why they occurred, and what their causes were. Reports can be created for management stating which projects are not meeting their goals. Project information can be broken down by phase, project, division, labor, hardware, software, or other categories. Since information about multiple projects is maintained in a single location, trends such as similar problems occurring in similar locations in different projects can easily be discovered.

Figure 3:
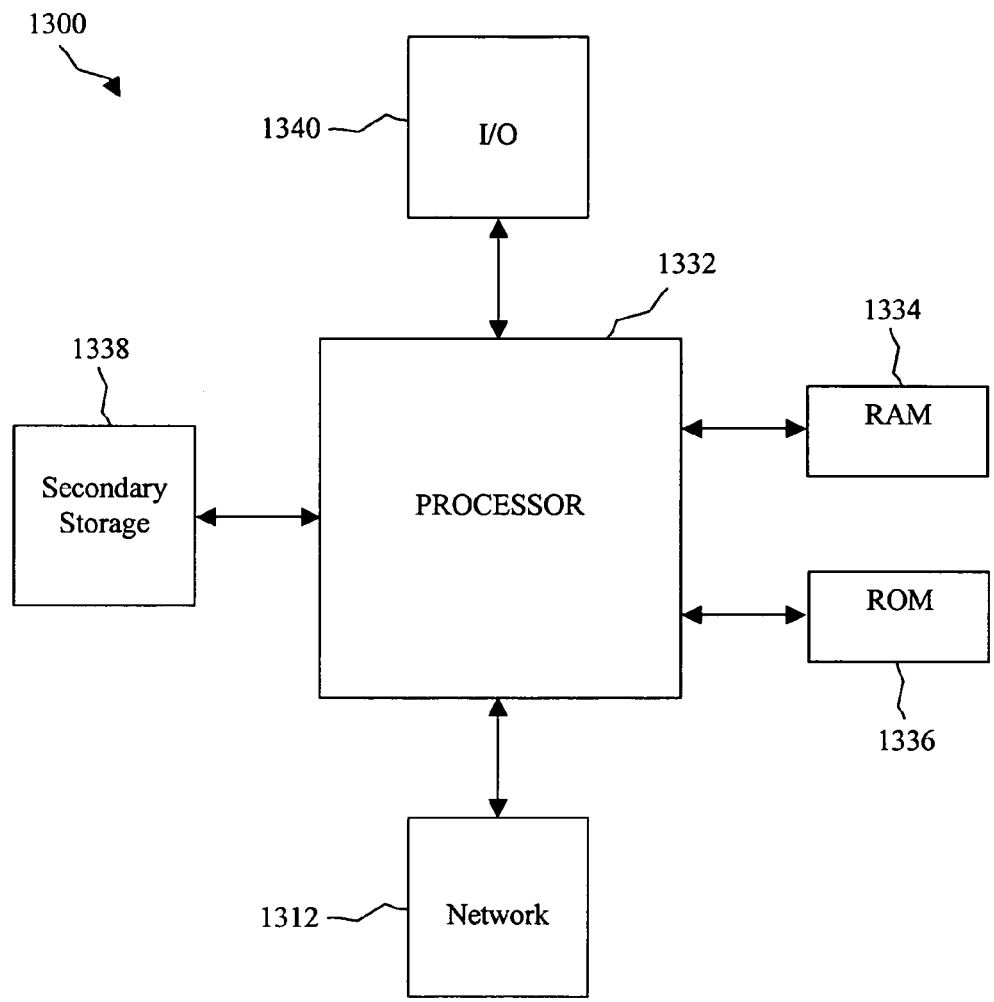
FIG. 3 is a block diagram of a computer system operable for some of the various embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage 1338. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented system comprising at least one processor for managing contracts for projects, comprising:
  a non-transitory computer-readable medium that comprises a data store, the data store maintains information related to a project including an original contract defining at least some targets for the project, the data store further maintains information for a plurality of interim contracts that include a change to the original contract, the information for the plurality of interim contracts including a target resource information, a target date information, a target financial information, and a variance information, wherein the interim contracts are created when changes to parameters of the project occur as the project progresses; and
  a non-transitory computer-readable medium that comprises an analysis component executable by the at least one processor that identifies a difference between at least one of the plurality of interim contracts and the original contract and further calculates the variance information as an amount of change for the at least one of the plurality of interim contracts based on the difference identified between the original contract and the at least one of the plurality of interim contracts, wherein the difference is identified between at least one of the resource information, the date information, and the financial information for the at least one of the plurality of interim contracts and the information related to the original contract;
  wherein the analysis component is further configured to calculate a parameter variance based on a change in a parameter of the project;
  wherein the data store further maintains a variance reason for the identified difference in a variance code related to the variance information;
  wherein the variance code is selected from a group of variance codes consisting of at least one of a schedule change, a scope change, a financial change, a split project change, and a deploy-launch change;
  wherein when the calculated parameter variance exceeds a pre-determined threshold a new contract is created or a decision is made whether to create a new contract;
  wherein the calculated parameter variance is shown as a difference or a percentage change; and
  wherein a calculated parameter variance having a first type of variance code is shown as a difference and a calculated parameter variance having a second different type of variance code is shown as a percentage change.

2. The computer-implemented system of claim 1, wherein the target resource information is further defined as human resources associated with the project.

3. The computer-implemented system of claim 1, wherein the target date information includes at least a completion date of the project.

4. The computer-implemented system of claim 1, wherein the target financial information includes a cost for at least a portion of the project.

5. The computer-implemented system of claim 1, wherein the parameter variance is further defined as the difference between the at least one of the interim contracts and one of the original contract and a preceding interim contract.

6. The computer-implemented system of claim 1, wherein the plurality of interim contracts includes a first, second, and third interim contracts, and wherein the first interim contract includes changes to the original contract, the second interim contract includes changes to the first interim contract, and wherein the third interim contract includes changes to the second interim contract.

7. The computer-implemented system of claim 1, wherein a reason for the change included in the parameter variance includes at least one of a scope change, a schedule change, and a financial change.

8. The computer-implemented system of claim 1, further comprising a non-transitory computer-readable medium that comprises a contract portal executable by at least one processor that creates a report when the project is not meeting at least one of the targets.

9. A computer-implemented method for managing contracts for projects, comprising:
  maintaining information on a computer-readable storage medium related to an original contract describing a project and defining at least some targets for the project;
  maintaining information on a computer-readable storage medium related to a first interim contract and a second interim contract, the first interim contract including information related to a first change in the project from the original contract, the second interim contract including information related to a second change in the project from the first interim contract, the first and second interim contracts each including a target resource information, a target date information, a target financial information, and a variance information, the variance information related to the first or second change to the project, wherein the first interim contract is created when the first change in the project occurs as the project progresses, and wherein the second interim contract is created when the second change in the project occurs as the project progresses;
  identifying, by an analysis component stored on a computer-readable storage medium and executed by a processor, a difference in at least one of the target resource information, the target date information, and the target financial information between two of the original contract, the first interim contract, and the second interim contract;
  analyzing, by the analysis component, the identified difference and calculating, by the analysis component, the variance information as an amount of change between two of the original contract and the first and second interim contracts;
  calculating, by the analysis component, a parameter variance based on a change in a parameter of the project;
  determining a reason for the variance and mapping the reason to a variance code, wherein the variance code is selected from a group of variance codes consisting of at least one of a schedule change, a scope change, a financial change, a split project change, and a deploy-launch change; and
  creating a new contract or deciding whether to create a new contract when the calculated parameter variance exceeds a pre-determined threshold, wherein the calculated parameter variance is shown as a difference or a percentage change, and wherein a calculated parameter variance having a first type of variance code is shown as a difference and a calculated parameter variance having a second different type of variance code is shown as a percentage change.

10. The computer-implemented method of claim 9, wherein the parameter variance comprises a financial variance.

11. The computer-implemented method of claim 9, wherein the parameter variance comprises a resource variance.

12. The computer-implemented method of claim 9, wherein the parameter variance comprises a date variance.

13. The computer-implemented method of claim 9, further comprising searching variance codes to manage contracts to determine reasons for parameter variances.

14. The computer-implemented method of claim 9, further comprising creating a report when the project is not meeting at least one of the targets.

* * * * *